US007930296B2

(12) United States Patent
Muras

(10) Patent No.: US 7,930,296 B2
(45) Date of Patent: *Apr. 19, 2011

(54) BUILDING DATABASE STATISTICS ACROSS A JOIN NETWORK USING SKEW VALUES

(75) Inventor: Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 412 days.

This patent is subject to a terminal disclaimer.

(21) Appl. No.: 12/105,754

(22) Filed: Apr. 18, 2008

(65) Prior Publication Data

US 2008/0228709 A1    Sep. 18, 2008

Related U.S. Application Data

(63) Continuation of application No. 11/089,468, filed on Mar. 24, 2005, now Pat. No. 7,386,538.

(51) Int. Cl.
*G06F 7/00* (2006.01)
*G06F 17/30* (2006.01)
(52) U.S. Cl. ......................................... 707/714; 707/688
(58) Field of Classification Search .......... 707/713–721, 707/999.002
See application file for complete search history.

(56) References Cited

U.S. PATENT DOCUMENTS

| 4,956,774 A * | 9/1990 | Shibamiya et al. ................... 1/1 |
| 6,263,345 B1 | 7/2001 | Farrar et al. |
| 6,272,487 B1 | 8/2001 | Beavin et al. |
| 6,401,083 B1 * | 6/2002 | Agarwal et al. ....................... 1/1 |
| 2003/0126127 A1 | 7/2003 | Abdo |
| 2003/0135485 A1 | 7/2003 | Leslie |
| 2005/0004907 A1 * | 1/2005 | Bruno et al. ...................... 707/4 |
| 2005/0021287 A1 | 1/2005 | Rjaibi |
| 2005/0267877 A1 | 12/2005 | Chaudhuri et al. |
| 2006/0149695 A1 | 7/2006 | Bossman et al. |

OTHER PUBLICATIONS

Jensen et al., "Frequent Itemset Counting Across Multiple Tables", PAKDD 2000, LNAI 1805, pp. 49-61, 2000.*
Peter J. Haas and Arun N. Swami, "Sampling-Based Selectivity Estimation for Joins Using Augmented Frequent Value Statistics," Proceedings of the Eleventh International Conference on Data Engineering, pp. 522-531, IEEE, 1995.
Phillip B. Gibbons, "Distinct Sampling for Highly-Accurate Answers to Distinct Values Queries and Event Reports," Proceedings of the 27th VLDB Conference, 2001.

* cited by examiner

*Primary Examiner* — Hosain T Alam
*Assistant Examiner* — Shew-Fen Lin
(74) *Attorney, Agent, or Firm* — Wood, Herron & Evans, LLP

(57) ABSTRACT

An apparatus and program product that build column statistics utilizing at least one skew value. The column statistics built using skew values, instead of column statistics built only through random sampling, may be used to more accurately reflect skew values across join networks, and thus enable a query optimizer to better select an access plan that is optimal under current runtime conditions.

12 Claims, 2 Drawing Sheets

BUILDING DATABASE STATISTICS ACROSS A JOIN NETWORK USING SKEW VALUES

CROSS-REFERENCE TO RELATED APPLICATIONS

This application is a continuation of U.S. patent application Ser. No. 11/089,468, filed on Mar. 24, 2005, by Brian Robert Muras (now issued as U.S. Pat. No. 7,386,538). In addition, this application is related to U.S. patent application Ser. No. 12/105,774, filed on even date herewith by Brian Robert Muras, which is also a continuation of the aforementioned '468 application. The entire disclosures of both applications are incorporated by reference herein.

FIELD OF THE INVENTION

The invention relates to database management systems, and in particular, to the building of database statistics for query optimization.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems. From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

Furthermore, significant development efforts have been directed toward query "optimization," whereby the execution of particular searches, or queries, is optimized in an automated manner to minimize the amount of resources required to execute each query. A query optimizer typically generates, for each submitted query, an access plan. In generating an access plan, a query optimizer typically creates multiple potential access plans, and selects the best among those potential access plans based upon the "cost" of each plan. The cost of each plan represents the amount of resources expected to be utilized by the plan (typically expressed in the expected amount of time to execute), and as such, selecting the plan with the lowest cost typically results in the most efficient (and quickest) execution of a query.

Database statistics are often used by a query optimizer to estimate the cost of potential access plans. For example, some optimizers rely on Frequent Value Lists (FVL's), which identify the most populous values of a column of a table. A FVL may also simply identify a certain number (N) of the most populous values, instead of all the populous values in the column of a table. Among other benefits, a FVL may be used to identify skew values, i.e., values that are represented more times in a column than an average value. Typically, skew values are among the most populous values of a column since skew values are represented more times in the column than an average value. Therefore, when a FVL is built for the column, the skew values are typically included in the FVL.

In many queries, there is often a join operation that is performed between columns of tables. A join is typically an operation used to combine data from two or more different tables according to some criteria. Many different types of joins exist. An inner join typically returns only those rows from the tables that match according to the criteria. An outer join, however, typically returns both the rows that match and the rows that do not have a match.

In many systems, separate FVL's are generated for each column of a join. During optimization, the FVL's of the columns in the join may be combined to estimate a join fanout, which is an estimate of the number of rows that will be returned or joined after the join operation completes. Therefore, FVL's are also beneficial in estimating the number of rows that will join, and thus ultimately what access plan will operate most efficiently given the estimated number of rows. Skew values are important for the join fanout calculation because a join that has columns with skew values will likely join with more rows than a join that has columns without skew values. Therefore, in order to accurately estimate join fanout, it is important to ensure that any skew values present in a column are considered when estimating the join fanout. Otherwise, when skew values are missing in any of the FVL's, this may lead to an underestimated join fanout when the FVL's are merged during optimization. As a result, the number of rows that will likely join may be underestimated. Moreover, the cost associated with the amount of time and resources required to carry out the join may also be underestimated and may mislead the optimizer to believe that the cost of an access plan is lower than it actually will be.

It has been found, however, that the FVL's of a join that contains a unique column may introduce a problem when attempting to estimate a join fanout during optimization. A unique column is a column that contains each unique value exactly once, whereas non-unique columns may contain values that are repeated in multiple rows. In particular, when one of the columns in the join is unique, the FVL of the unique column in the join may not properly reflect any skew values for the join as a whole. Typically, a skew value in a non-unique column stands out and will appear in the FVL of a non-unique column as one of the N most populous values. However, that same value may not stand out in a unique column. As a result, a value in a unique column that is a skew value in the column of a foreign table of the join, but that is not a skew value in the local table, is often omitted from the FVL of the unique column.

Conventional optimization techniques do not provide a way to ascertain the skew values in a foreign table. Moreover, since particular values in a unique column may not stand out, many designs arbitrarily or randomly sample values from a unique column to build the FVL for the unique column. Thus, using conventional techniques, the probability that the skew value of a foreign table is randomly chosen from the unique column to build the FVL is often low. The probability depends upon the value of N and the quantity of records in the unique column. Given that the quantity of records can range from tens of records to millions of records, the unpredictable nature of the conventional techniques typically results in FVL's for unique columns that do not reflect skew values across the join.

In some systems, a cardinality formula may be used to increase the join fanout estimate and account for some of the rows that will join but are not reflected in the FVL's. However, the estimates typically resulting from the cardinality formula may still underestimate the number of rows that will be joining. Therefore, it is desirable for FVL's to reflect as accurately as possible any skew values across the join. Without a better reflection of the skew values in the FVL's, the FVL's may lead to an underestimated join fanout, underestimated costs, the selection of a suboptimal access plan under the current runtime conditions by the query optimizer, and performance problems.

A need therefore exists in the art for an improved manner of building database statistics that more accurately reflects skew values in foreign tables, thus, resulting in statistics that more accurately reflect skew across joins and leading to the selection of better access plans and improved performance.

SUMMARY OF THE INVENTION

The invention addresses these and other problems associated with the prior art by providing an apparatus, program product and method that build column statistics utilizing a least one skew value. Typically, the column statistics may be used to more accurately reflect skew values across join networks, and thus enable a query optimizer to better select an access plan that is optimal under current runtime conditions.

For example, certain embodiments consistent with the invention may detect at least one skew value in a join network and utilize the detected skew value to build or rebuild column statistics such as a Frequent Value List (FVL), a data distribution, a histogram, an index, or an encoded vector index, resulting in column statistics that more accurately reflect skew values across a join network.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter build column statistics using a least one skew value to more accurately reflect skew values across join networks. In the context of a query, all join predicates, i.e., expressions that join at least two columns according some criteria, that may be compared against each other directly or indirectly via transitive closure may be considered to form a set referred to herein as a join network. A join network may also represent less than all the join predicates in a given query consistent with the invention. Additionally, there may be more than one join network in a database query. For example, the following database query Q1 may be considered as containing two join networks, i.e., (x.f1, y.f1, z.f1) and (a.f2 and z.f2):

Q1: select * from a, x, y, z
where x.f1=y.f1 and y.f1=z.f1 and a.f2=z.f2

A join network may also be multi-column and embodiments consistent with the invention may take advantage of the invention with a multi-column statistic such as a multi-column FVL. For example, in the following database query Q2, each column f1 and each column f2 may be concatenated or appended to each other from tables x, y, and z to form a multicolumn join network, i.e., (x.f1 x.f2, y.f1 y.f2, z.f1 z.f2):

Q2: select * from x, y, z
where x.f1=y.f1 and x.f2=y.f2 and y.f1=z.f1 and y.f2=z.f2

Columns may be concatenated from the same table and/or from different tables. Furthermore, a join in a join network may represent practically any type of join, e.g. an actual join in a query, a join that will likely occur in a future query, columns related as being likely to be joined in a database query, etc.

A column statistic consistent with the invention may represent practically any type of column statistic, e.g., Frequent Values List (FVL), data distribution, histogram, an index, and an encoded vector index, etc. One of ordinary skill in the art will recognize that other column statistics may be utilized as well. The column statistics may be built in response to a query or user request, and may be built either in the requesting process or in a background job process. The results of the column statistics can be used on the same query or used on future queries. Furthermore, the order in which to build column statistics of a join network may vary consistent with this invention. For example, the column statistics for non-unique columns of a join network may be built before the column statistics of unique columns of a join network. Moreover, column statistics may be built and/or rebuilt multiple times based upon newly detected skew values.

A skew value consistent with the invention may represent practically any type of data present in a table, e.g. numerical data, alpha-numeric data, etc. Moreover, the embodiments discussed hereinafter can detect multiple skew values, e.g. the top N, the top X percentage, all values with greater than X percentage, etc. Skew value detection can occur more than once consistent with the invention.

Figure 1:
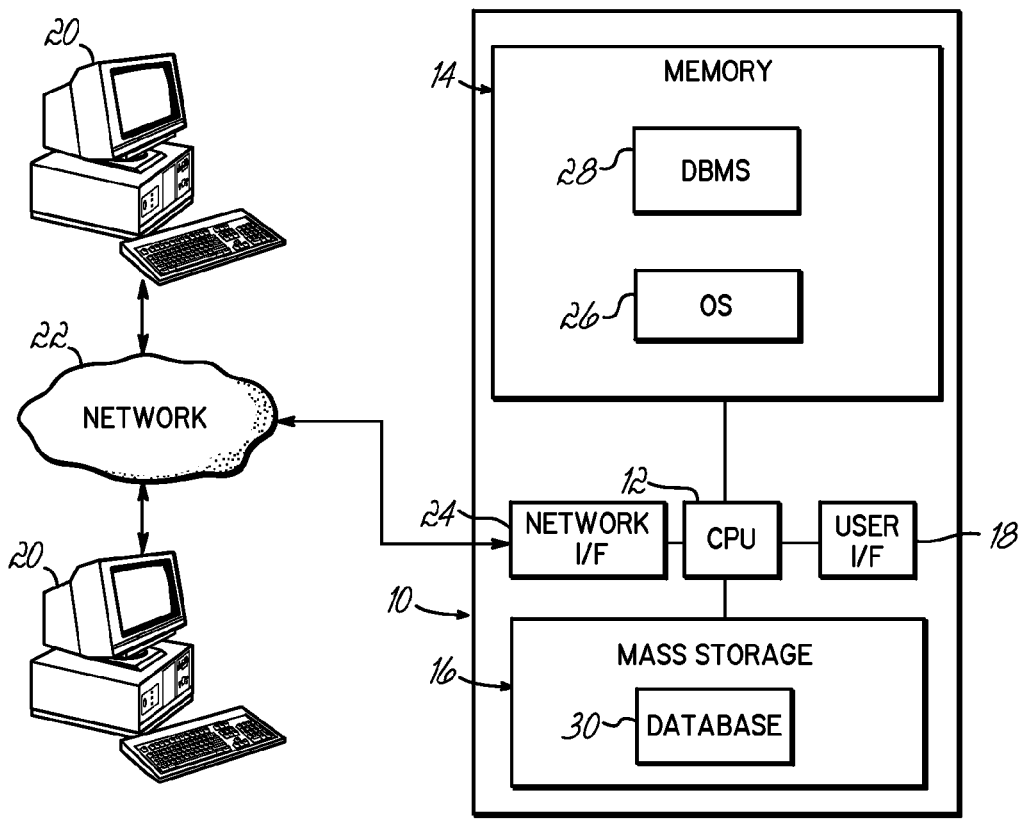
FIG. 1 is a block diagram of a networked computer system incorporating a database management system within which is implemented query optimization consistent with the invention.

Turning now to the Drawings, wherein like numbers denote like parts throughout the several views, FIG. 1 illustrates an exemplary hardware and software environment for an apparatus 10 suitable for implementing a database management system incorporating query optimization consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
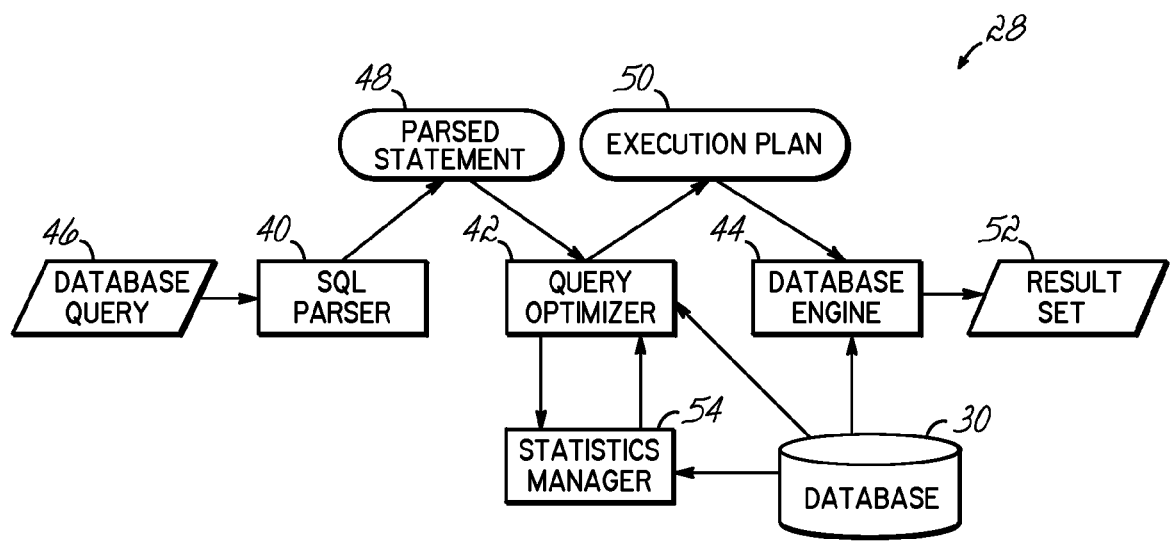
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated. Once generated, the execution plan is forwarded to database engine 44 for execution of the database query on the information in database 30. The result of the execution of the database query is typically stored in a result set, as represented at block 52.

To facilitate the optimization of queries, DBMS 28 may also include a statistics manager 54. The statistics manager 54 may be used to gather and analyze statistical information for the query optimizer 42. The statistical information may be derived by the statistics manager 54 from database 30 by using and/or creating indexes and column statistics. These column statistics may be merged during optimization to estimate a join fanout. The statistics manager 54 may also identify join networks and detect skew values. To assist in generating an optimal access plan, query optimizer 42 is configured to communicate with and receive communication from statistics manager 54. It will be appreciated, however, that the query optimizer and statistics manager may be allocated different functionality in other embodiments consistent with the invention. Moreover, the statistics manager may be contained or integrated within the query optimizer. The statistics manager may also have other components or may be omitted completely in some embodiments. Furthermore, other components and functionality may also be incorporated into DBMS 28, as may other suitable database management architectures. Other database programming and organizational architectures may also be used consistent with the invention. Therefore, the invention is not limited to the particular implementation discussed herein.

Figure 3:
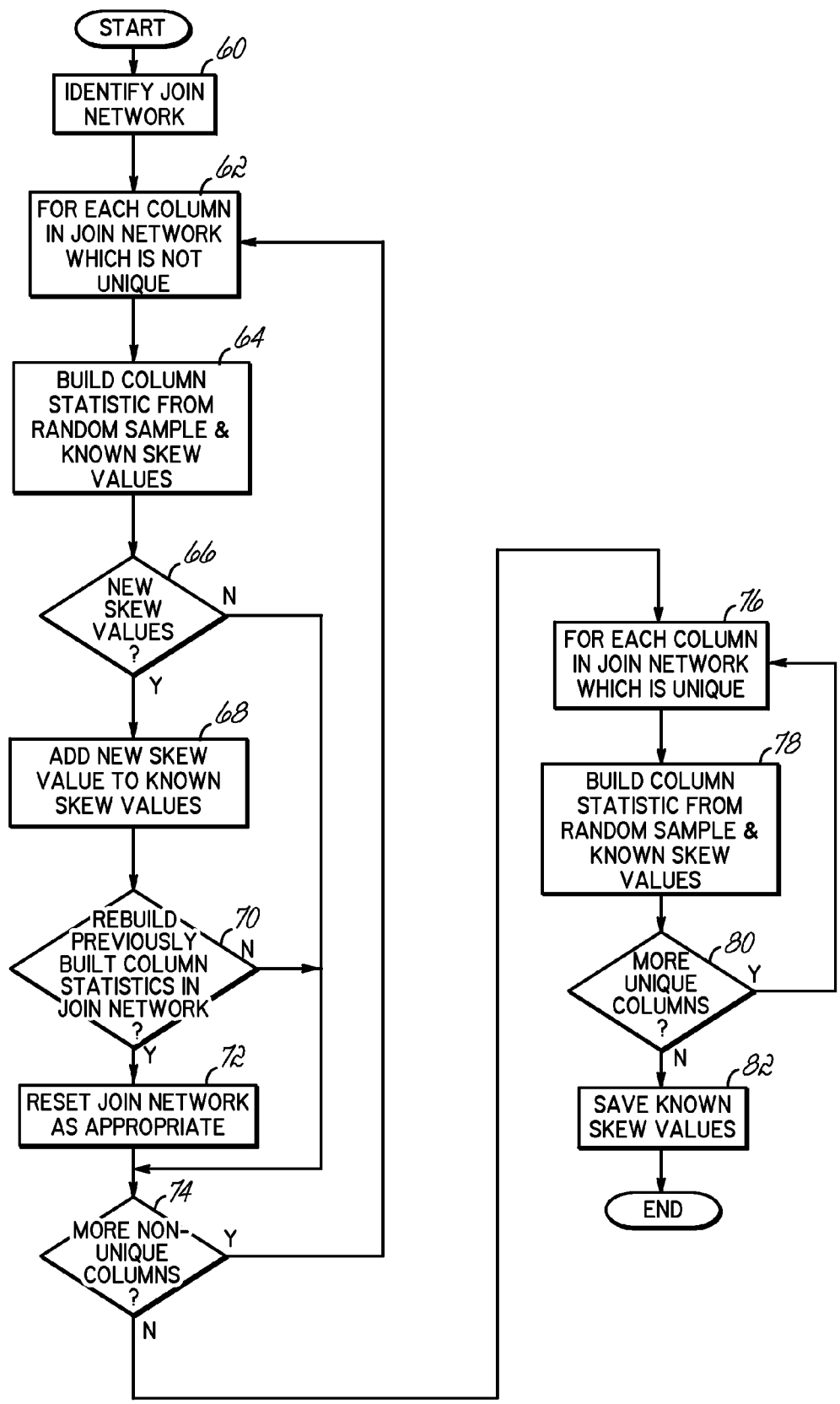
FIG. 3 is a flowchart illustrating the program flow of one implementation of a process of building column statistics across a join network using skew values.

FIG. 3 illustrates a flowchart of an exemplary method for building column statistics in accordance with the principles of the present invention. In block 60, a join network is identified. As stated above, the join network can be an actual join in a query, a join network that will likely occur in a future query, columns related as being likely to be joined in a database query, etc. Columns related as being likely to be joined in a database query can be identified based upon primary and foreign key constraints such as those defined by an administrator, based upon naming structure such as each column having the same name, or based upon the access plan cache of completed queries. Those of ordinary skill in the art will recognize that other modes of identifying a join network may be utilized as well.

Next, block 62 initiates a FOR loop to process a plurality of columns identified in the join network that are not unique. Uniqueness of a column may be obtained from a cached access plan, table, or any other mode recognized in the art. Additionally, where the uniqueness of the column cannot be ascertained, the column may be categorized as not unique consistent with this invention. Those of ordinary skill in the art will appreciate the benefits of commencing the implementation with non-unique columns. As stated previously, random sampling of unique columns typically leads to column statistics that do not reflect skew values from foreign tables. However, because this exemplary implementation starts building column statistics on non-unique columns first, it ensures that the column statistics built subsequently for unique columns more accurately reflect the skew values from the foreign tables.

Next, for each such non-unique column, control passes to block 64 to build a column statistic from a random sample of the non-unique column and any known skew values. The column statistics can be any type of column statistics known in the art, e.g., Frequent Values List (FVL), data distribution, histogram, an index, an encoded vector index, etc. Consistent with the invention, known skew values can be any type of data structure, table, row, column, variable, etc. In building a column statistic with known skew values, a table scan or other method such as an index probe may be used to determine if the values in known skew values are in the non-unique column. Those of ordinary skill in the art will appreciate that columns may change due to updates and deletions, therefore, the skew values in known skew values may not be in the non-unique column. Therefore, a skew value in known skew values may be used to build the column statistic for the non-unique column when the skew value is present in the non-unique column, otherwise it is not. Control then passes to block 66, which determines if any new skew values were detected from the column statistic built in block 64. If new skew values were not detected in block 66, then control passes to block 74 to determine whether there are any more non-unique columns left to process. However, if new skew values were detected in block 66, then the new skew values are added to the known skew values in block 68. New skew values are skew values not present in the list of known skew values.

Also, upon detecting new skew values, block 70 determines whether at least one previously built column statistic may be rebuilt using the known skew values. If so, control passes to block 72 to reset the join network to rebuild the column statistic. A previously built column statistic is rebuilt using a random sample and the known skew values. Consistent with this invention, at least one previously built column statistic may not be rebuilt, at least one previously built column statistic may be rebuilt more than once, and/or the time to start rebuilding at least one previously built column statistic is flexible. Those of ordinary skill in the art will appreciate that there may not be a need to rebuild a previously built column statistic if that previously built column statistic contains all the skew values in known skew values. Additionally, any previously built column statistic lacking any skew values can be rebuilt immediately consistent with the invention, but, this may require additional rebuilds if any more new skew values are detected in future iterations. Therefore, it will also be appreciated in the art that time and resources can be conserved if the rebuilding of at least one previously built column statistic occurs after processing of the last non-unique column has finished, since known skew values will likely be the most accurate after any new skew values have been detected from a column statistic of the last non-unique column in the join network. Alternatively, instead of rebuilding at least one previously built column statistic, the column statistic can be built using the known skew values when the column statistic is refreshed due to staleness. A column statistic may become stale when the values in the corresponding column have changed due to deletions, additions, and updates to a point that the column statistic may no longer properly represent the values in the column. Nonetheless, a combination of any of these approaches is also consistent with the invention. Additionally, if any new skew values are detected from any rebuilt column statistics, a similar methodology may also be followed and may include the additional step of rebuilding the column statistic of the last non-unique column at least once. Regardless of whether any column statistics are rebuilt, control next passes to block 74 to determine if there are more non-unique columns. If so, control passes to block 62 to process additional columns, otherwise, control passes to block 76.

Block 76 initiates a FOR loop to process a plurality of columns identified in the join network 60 that are unique. For each such unique column, control passes to block 78 to build a column statistic from a random sample of the unique column and the known skew values. However, known skew values may not contain any skew values if the join network did not contain non-unique columns. Next, block 80 determines if any more unique columns exist. If so, control passes to block 76 to process additional unique columns. When there are no more unique columns remaining, control passes to block 82 to save the known skew values. For example, if the join network changes and column statistics are required for new columns, building column statistics for these new columns using the known skew values may avoid having to recreate the column statistics for the old columns, thus, improving performance and providing a more accurate reflection of skew values across the join network without repeating the entire implementation.

The following example demonstrates the advantages of the illustrated embodiment over conventional statistics collection methodologies. In this example, a join network is identified between a non-unique column DimID of Fact Table, shown in TABLE I, and a unique column DimID of Dimension Table, shown in TABLE II.

TABLE I

FACT TABLE

| DimID | Other Data |
|---|---|
| 1 | ... |
| 99 | ... |
| 3 | ... |
| 1 | ... |
| 2 | ... |
| 1 | ... |
| 4 | ... |
| 1 | ... |
| 1 | ... |
| 98 | ... |
| 1 | ... |
| 97 | ... |

TABLE II

DIMENSION TABLE

| DimID | Other Data |
|---|---|
| 1 | ... |
| 2 | ... |
| 3 | ... |
| 4 | ... |
| 5 | ... |
| 6 | ... |
| 7 | ... |
| 8 | ... |
| 9 | ... |
| 10 | ... |
| 11 | ... |
| 12 | ... |

In this join network, nine rows will join.

Using conventional sampling techniques, a FVL might be built over the non-unique column DimID of Fact Table as shown in TABLE III.

TABLE III

FVL FOR FACT TABLE

| Value | Count |
|---|---|
| 1 | 6 |
| 3 | 1 |
| 4 | 1 |

Using conventional sampling techniques, a FVL may be built over the unique column DimID of Dimension Table as shown in TABLE IV. Given the uniqueness of the column, the values included in the FVL for the column may be randomly selected.

TABLE IV

FVL FOR DIMENSION TABLE

| Value | Count |
|---|---|
| 2 | 1 |
| 3 | 1 |
| 4 | 1 |

Conventional sampling techniques easily reflect a skew value of '1' in the FVL of Fact.DimID, as '1' is present six times. However, even though '1' is a skew value in the foreign Fact Table, and the value '1' was present in the unique column Dimension.DimID, '1' was not selected for the FVL of Dimension.DimID due to random sampling. Therefore, when the two FVL's are merged during optimization, it will appear as if only two rows will join because the skew value '1' was not reflected in the FVL of Dimension.DimID. The illustrated embodiment, on the other hand, provides an approach that more accurately reflects skew values across this and other join networks. As a result, when the FVL's of columns in a join network are merged at optimization, the skew values built into the FVL's of the join network lead to a much more accurate estimate of the number of rows that will join. Using the same example, the illustrated embodiment first builds a FVL for the non-unique column Fact.DimID as shown in TABLE III. The illustrated embodiment then identifies '1' as a skew value and stores '1' in known skew values. Using the known skew values, a FVL is then built for the unique column Dimension.DimID as show in TABLE V.

TABLE V

FVL FOR DIMENSION TABLE BUILT BY ILLUSTRATED EMBODIMENT

| Value | Count |
|---|---|
| 1 | 1 |
| 2 | 1 |
| 4 | 1 |

By building the FVL of Dimension.DimID using the known skew values, this ensures that '1', the skew value in the foreign Fact Table, is selected for the FVL of Dimension.DimID. Therefore, when the FVL of Fact.DimID and the FVL of Dimension.DimID are merged during optimization, the join fanout will more accurately reflect the number of rows that will join. Where the conventional approach estimated that two rows would join, the illustrated embodiment results in an estimate of seven rows joining, which is much closer to the nine rows that will actually join in this join network.

The invention thus provides a novel approach that uses detected skew values to build column statistics which more accurately reflect skew values across a join network. As a result, the invention leads to better estimates of the number of rows that will join and the selection of an optimal access plan under the current runtime conditions.

Various modifications may be made to the illustrated embodiments without departing from the spirit and scope of the invention. For example the term column, table and row are usually used in connection with relational databases. However, these terms are not meant to limit the present invention to relational databases as these terms may be used in general to describe like entities in other types of databases such as, for example, object-oriented databases and flat file structures. Therefore, the invention lies in the claims hereinafter appended.

What is claimed is:

1. An apparatus, comprising:
at least one processor;
a memory; and
program code resident in the memory and configured to be executed by the at least one processor to build database statistics, the program code configured to build a first column statistic for a first column in a first table, including detecting a skew value in the first column statistic, and based upon the skew value detected in the first column statistic, use the skew value to build a second column statistic for a second column in a second table that is likely to be joined with the first column in a database query, wherein the program code is configured to build the second column statistic by including the skew value with a random sample of values in the second column, and wherein the program code is configured to determine that the second column is more unique than the first column, and to build the first column statistic before building the second column statistic based upon the determination that the second column is more unique than the first column.

2. The apparatus of claim 1, wherein the program code is configured to build the first column statistic by including the skew value with a random sample of values in the first column.

3. The apparatus of claim 1, wherein the first column statistic and the second column statistic include at least one of a frequent value list, a data distribution, a histogram, an index, and an encoded vector index.

4. The apparatus of claim 1, wherein the program code is configured to detect at least one skew value in the second column statistic.

5. The apparatus of claim 4, wherein the program code is configured to rebuild the first column statistic using the detected skew value in the second column statistic.

6. The apparatus of claim 1, wherein the program code is configured to store at least one detected skew value for building at least one column statistic.

7. A program product, comprising:
program code configured to build database statistics by building a first column statistic for a first column in a first table, including detecting a skew value in the first column statistic, and based upon the skew value detected in the first column statistic, use the skew value to build a second column statistic for a second column in a second table that is likely to be joined with the first column in a database query, wherein the program code is configured to build the second column statistic by including the skew value with a random sample of values in the second column, and wherein the program code is configured to determine that the second column is more unique than the first column, and to build the first column statistic before building the second column statistic based upon the determination that the second column is more unique than the first column; and
a recordable computer readable medium bearing the program code.

8. The program product of claim 7, wherein the program code is configured to build the first column statistic by including the skew value with a random sample of values in the first column.

9. The program product of claim 7, wherein the first column statistic and the second column statistic include at least one of a frequent value list, a data distribution, a histogram, an index, and an encoded vector index.

10. The program product of claim 7, wherein the program code is configured to detect at least one skew value in the second column statistic.

11. The program product of claim 10, wherein the program code is configured to rebuild the first column statistic using the detected skew value in the second column statistic.

12. The program product of claim 7, wherein the program code is configured to store at least one detected skew value for building at least one column statistic.

* * * * *